Jan. 26, 1971   P. D. JONES   3,559,099
PULSE PRODUCING CIRCUITS
Filed Oct. 21, 1968
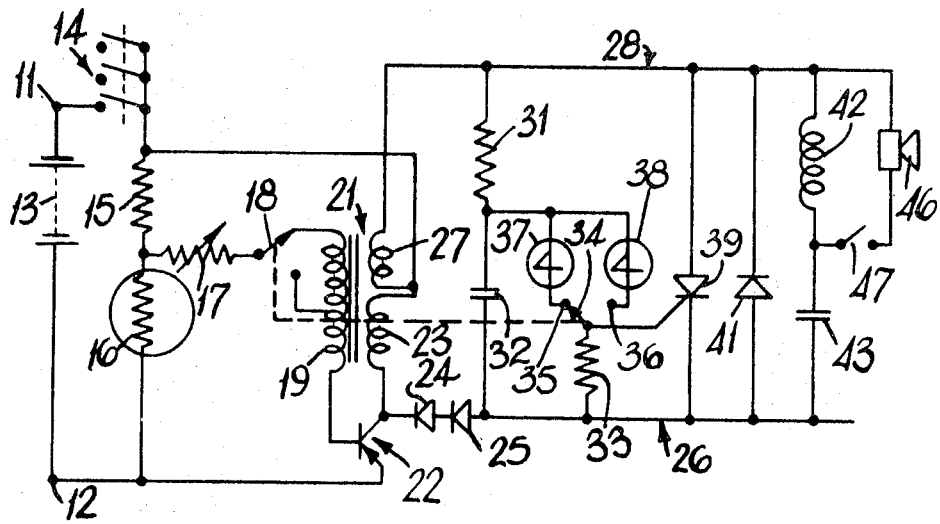
INVENTOR
BY Peter David Jones
Glascock, Downing & Seebold
ATTORNEY United States Patent Office 3,559,099
Patented Jan. 26, 1971

3,559,099
PULSE PRODUCING CIRCUITS
Peter David Jones, Solihull, England, assignor to Joseph Lucas (Industries) Limited, Birmingham, England, a British company
Filed Oct. 21, 1968, Ser. No. 769,094
Claims priority, application Great Britain, Feb. 10, 1965, 5,728/65
Int. Cl. A61h 31/00
U.S. Cl. 331—111
3 Claims

ABSTRACT OF THE DISCLOSURE

A pulse producing circuit includes a pair of supply lines to which power is supplied by an oscillator. When the oscillator supplies power to the lines, it charges two capacitors at the same time. The first capacitor is connected across the lines in series with a resistor, and when the charge on this capacitor reaches a predetermined value a breakdown device conducts, and the first capacitor discharges to turn on a switch. This switch then provides a discharge path for the second capacitor which discharges through a load.

---

This invention relates to pulse producing circuits.

A pulse producing circuit according to the invention comprises in combination a pair of supply lines, an oscillator providing a power to said supply lines, a resistor and a first capacitor connected in series across said supply lines, a breakdown device connected across the first capacitor, the breakdown device conducting to permit discharge of the first capacitor when the voltage across the first capacitor reaches a predetermined value, a pair of output terminals between which in use a load is connected, a second capacitor which in use is charged by the power applied to the supply lines at the same time as the first capacitor, a switch device when conductive provides a discharge path for the second capacitor through the load, and means whereby the switch device is turned on by the discharge current of the first capacitor.

The accompanying drawing is a circuit diagram illustrating one example of the invention.

Referring to the drawing, there are provided first and second terminals 11, 12 which in use are connected to a battery 13 so as to be negative and positive respectively. The terminals 11, 12 are interconnected through a series circuit including three ganged manually operable switches 14 in parallel, together with a resistor 15 and a thermistor 16. A point intermediate the resistor 15 and thermistor 16 is connected through a variable resistor 17 to a movable contact 18 which in one position engages one end of a feed back winding 19 on a transformer 21, and in its other position engages an intermediate point on the winding 19. The other end of the winding 19 is connected to the base of a p-n-p transistor 22 the emitter of which is connected to the terminal 12 and the collector of which is connected through the primary winding 23 of the transformer and the manually operable switches 14 in series to the terminal 11.

The collector of the transistor 22 is further connected through the cathodes and anodes of a pair of diodes 24, 25 to one output line 26, whilst the secondary winding 27 of the transformer has one end connected to a second output line 28, and its other end connected to the terminal 11 through the manually operable switches 14.

The output lines 28, 26 are interconnected through a resistor 31 in series with a capacitor 32 and moreover the line 26 is connected through a resistor 33 to a movable contact 34 which engages alternatively contact pieces 35, 36. The contact piece 35 is connected to the line 28 through a four-layer diode 37 in series with the resistor 31, and the contact piece 36 is connected to the line 28 through a second four-layer diode 38 in series with the resistor 31. The four-layer diodes 37, 38 break down at different voltages. The contact 34 is further connected to the gate of a thyristor 39 having its cathode and anode connected to the lines 26, 28 respectively. The lines 28, 26 are further bridged by parallel circuits one of which contains the cathode and anode of a diode 41, and the other of which contains a load (in the form of an inductor 42) in series with a capacitor 43.

The movable contacts 18, 34 are ganged for simultaneous operation, and assuming that the contact 34 engages the contact piece 35, then the contact 18 engages the end of the winding 19. The circuit then operates as follows:

The transistor 22 together with its associated transformer 21 forms a feedback oscillator which operates in known manner to provide high voltage pulses between the lines 28, 26. Operation of the oscillator is initiated by current flowing through the resistor 17, and a pulse terminates when the transistor 22 saturates. The variable resistor 17 sets the frequency, and the thermistor 16 provides compensation for variations in temperature.

When a pulse appears between the lines 28, 26 the capacitor 43 is charged through the inductor 42, and the capacitor 32 is charged through the resistor 31. When the charge across the capacitor 32 reaches the breakdown voltage of the four-layer diode 37, the diode 37 breaks down, and the capacitor 32 discharges through the resistor 33. As a result, a positive pulse is applied to the gate of the thyristor 39, which conducts to allow the capacitor 43 to discharge through the inductor 42 and the thyristor 39. A pulse thus appears across the inductor.

In the absence of the diode 41, the circuit including the capacitor 43 and inductor 42 would oscillate, until the thyristor 39 is switched off by the reverse bias across it, and so the capacitor 43 would end up charged in the reverse sense from which it is charged by the pulse between the lines 28, 26. The purpose of the diode 41 is to recover energy by allowing the oscillation to continue for a further 180°, so charging the capacitor 43 partially in the same way as it is charged when a pulse appears between the lines 28, 26. Any transients resulting from the diode 41 switching off are conducted by the capacitor 32, which therefore minimises the risk of the transients switching on the thyristor 39 again.

If a pulse of lower energy is required across the inductor 42, the contact 34 is engaged with the contact piece 36. In this case, the four-layer diode 38 breaks down when the voltage across the capacitor 32 is at a lower level than in the example described above. As a result, the voltage across the capacitor 43 is less at the instant when the thyristor 39 is switched on, and the energy of the pulse appearing across the inductor 42 is less. In this example, the contact 18 moves into engagement with an intermediate point on the winding 19, and as a result there is less feedback to the base of the transistor 22. This reduces the rate of transfer of energy from the battery 13 to the lines 28, 26, thereby ensuring that irrespective of the position of the contacts 18, 34 the timing of the pulses will be the same for a given setting of the resistor 17.

The circuit described is intended for use in stimulating the human heart. For this purpose, the inductor 42 constitutes the primary winding of a transformer, the secondary winding of which is located beneath the skin of a patient and is connected to the heart. Certain patients require higher energy pulses than others, and for this purpose the contacts 18, 34 are incorporated in the circuit. These contacts are set in accordance with the requirements of the patient, and are then sealed so that they are not accessible to the patient. However, the variable resistor 17 is accessible to the patient and can be adjusted to alter the timing of the pulses. Preferably, a loudspeaker 46 is connected in series with a switch 47 across the inductor 42, and when the switch 47 is closed the loudspeaker renders the pulses audible so that the rate can be accurately set.

Having thus described my invention what I claim as new and desire to secure by Letters Patent is:

1. A pulse producing circuit comprising in combination a pair of supply lines, an oscillator providing power to said supply lines, a resistor and a first capacitor connected in series across said supply lines, a breakdown device connected across the first capacitor, the breakdown device conducting to permit discharge of the first capacitor when the voltage across the first capacitor reaches a predetermined value, a pair of output terminals between which in use a load is connected, one of said output terminals being connected to one of said supply lines, a second capacitor, means connecting the other output terminal to the other supply line through said second capacitor, said second capacitor being charged in use by the power applied to the supply line at the same time as the first capacitor, a switch device connected across the supply lines and which when conductive provides a discharge path for the second capacitor through the load, means whereby the switch device is turned on by the discharge current of the first capacitor, and means whereby the switch device is turned off when the second capacitor has discharged, the circuit further including a diode connected across the supply lines so as to permit partial recharging of the second capacitor after the switch device is turned off.

2. A pulse producing circuit comprising in combination a pair of supply lines, a D.C. source, an oscillator coupled to said D.C. source, means coupling said oscillator to said supply lines to provide pulses to said supply lines, a variable resistor in said oscillator for determining the frequency at which pulses are applied to said supply lines, a first breakdown device having a predetermined breakdown voltage, a second breakdown device having a predetermined breakdown voltage different from that of said first breakdown device, means for alternatively connecting said first and second breakdown devices across said first capacitor for providing a discharge circuit for said capacitor on break down of the respective connected breakdown device, a pair of output terminals, a second capacitor connected across said supply lines, said second capacitor charging at the same time as said first capacitor, switch means connected for response to breakdown of the breakdown device connected across the first capacitor, said switch means being turned on when the first capacitor discharges through one of the breakdown devices, and said switch means when turned on providing a discharge path for said second capacitor to provide at said output terminals a pulse of energy of a substantially predetermined magnitude according to which breakdown device is connected across said second capacitor, and means for maintaining constant the frequency at which pulses are developed by said oscillator for a given setting of said variable resistor irrespective of which breakdown device is connected across said first capacitor.

3. A pulse circuit as defined in claim 2 wherein said oscillator includes a feedback winding with taps for connecting two sets of turns in circuit in said oscillator means, and means for alternatively connecting a different predetermined set of said feedback winding turns concurrently with the alternating connection of one of said breakdown devices across said first-mentioned capacitor so as to maintain said frequency constant for a given setting of said variable resistor.

References Cited
UNITED STATES PATENTS 3,302,128  1/1967  Schoemehl et al. _____ 331—111

FOREIGN PATENTS 686,783  12/1939  Germany _____ 331—130

OTHER REFERENCES

L. H. Light, Wireless World, pp. 582–586, December 1955.

JOHN KOMINSKI, Primary Examiner

U.S. Cl. X.R.

128—2.05; 331—64, 75